United States Patent [19]

Schultz

[11] 4,230,472

[45] Oct. 28, 1980

[54] METHOD OF FORMING A SUBSTANTIALLY CONTINUOUS OPTICAL WAVEGUIDE

[75] Inventor: Peter C. Schultz, Painted Post, N.Y.

[73] Assignee: Corning Glass Works, Corning, N.Y.

[21] Appl. No.: 13,922

[22] Filed: Feb. 22, 1979

[51] Int. Cl.³ .................. C03B 37/00; C03C 25/02
[52] U.S. Cl. ............................... 65/3 A; 65/18; 65/60 D; 264/1; 427/167
[58] Field of Search ............ 65/3 A, 4 B, 18, 60 D; 427/167; 264/1

[56] References Cited

U.S. PATENT DOCUMENTS

| | | | |
|---|---|---|---|
| 3,227,032 | 1/1966 | Upton | 65/4 B X |
| 3,711,262 | 1/1973 | Keck et al. | 65/3 A |
| 3,737,292 | 6/1973 | Keck et al. | 65/3 A |
| 3,957,474 | 5/1976 | Kobayashi et al. | 65/18 X |
| 4,062,665 | 12/1977 | Izawa et al. | 65/3 A |
| 4,135,901 | 1/1979 | Fujiwara et al. | 65/3 A |

OTHER PUBLICATIONS

"Vapor Deposition", Powell et al., The Electrochemical Society, Wiley & Sons, Inc., New York, London, Sydney, pp. 3, 259-263, 1966.
"Continuous Fabrication of High Silica Preform", Izawa et al., Int. Conf. on Integrated Optics Optical Fiber Communication, 7/1977, Tokyo, Japan, pp. 375-377.

*Primary Examiner*—Robert L. Lindsay, Jr.
*Attorney, Agent, or Firm*—Walter S. Zebrowski; William J. Simmons, Jr.

[57] ABSTRACT

A method of forming a preform or blank for an optical filament, the preform itself and the resulting optical filament is disclosed. The preform is formed by providing a substantially longitudinally continuous core member and affixing it to a starting member. Particulate material is applied to the exterior surface of the core member to form an adherent coating having an index of refraction less than that of the core member. The starting member and the core member are longitudinally translated while simultaneously applying the adherent coating of particulate material to the core member to form a continuous and substantially homogeneous adherent coating of substantially uniform thickness. The composite so formed is simultaneously or subsequently heated to sinter or consolidate the applied adherent coating thereby forming a solid blank which may be heated to the drawing temperature of the material thereof and drawn to reduce the cross-sectional area thereof forming a substantially continuous optical waveguide, the core member comprising the core while the consolidated coating comprising the cladding of the optical waveguide. The adherent coating may be sintered or consolidated to form a solid blank and thereafter drawn in a separate operation or subsequently drawn as part of a continuing operation. As an alternate, the optical waveguide may be drawn immediately following the sintering or consolidation step employing a single heating of the structure.

25 Claims, 4 Drawing Figures

METHOD OF FORMING A SUBSTANTIALLY CONTINUOUS OPTICAL WAVEGUIDE

BACKGROUND OF THE INVENTION

This invention relates to a substantially continuous method of making an optical filament transmission medium, and more particularly to a method of making optical waveguides of the type that are adapted to propagate only one or a few modes.

High capacity communication systems operating around $10^{15}$ Hz are needed to accommodate future increases in communication traffic. The systems are referred to as optical communication systems since $10^{15}$ Hz is within the frequency spectrum of light. Optical waveguides, which are the most promising medium for transmission at such frequencies, normally consist of an optical filament having a transparent core surrounded by transparent cladding material having a refractive index which is lower than that of the core. A very thorough and complete discussion concerning the operational theories of optical waveguides is contained in U.S. Pat. No. 3,157,726 issued to Hicks et al., and in the publication "Cylindrical Dielectric Waveguide Modes" by E. Snitzer, Journal of the Optical Society of America, Vol. 51, No. 5, pp. 491–498, May 1961. Another excellent source of information concerning optical waveguides is "Fiber Optics—Principles and Applications" by N. S. Kapany, Academic Press, 1967.

The propagation of light waves is governed by laws of physics similar to those that govern microwave propagation and therefore can be studied in terms of modes. Each of these modes has its own propagation and distribution characteristics. The conditions under which propagation of a particular mode will no longer be localized within and around the core of an optical filament can be expressed in terms of a cutoff value or parameter U. An exceptionally complex equation, and an explanation thereof, from which the value U for a particular mode can be determined may be found on page 55 of the aforementioned publication by N. S. Kapany. Kapany also expresses a fiber characteristic term R, now commonly referred to as V, in terms of the optical fiber variables by the equation $$V = (2\pi a/\lambda) \sqrt{n_1^2 - n_2^2} \qquad (1)$$

where $a$ is the core radius of the waveguide, $\lambda$ is the wavelength of light to be transmitted, and $n_1$ and $n_2$ are the refractive indices of the core and cladding, respectively. As explained in Kapany, for particular mode to propogate in an optical filament having a particular filament characteristic V, V must be greater than or equal to the cutoff value U for said mode.

Typical multimode waveguides have core diameters between 50 micrometers and 100 micrometers and core-cladding refractive index differences of several percent. Thousands of modes propagate, each mode traveling at a slightly different group velocity. A short input pulse that is shared by many guided modes thus splits up into a sequence of pulses that arrive at the output end at different times. This pulse dispersion limits the information carrying capacity of multimode waveguides. The total number of modes that can be supported by a waveguide filament is given approximately by the equation $$N = \tfrac{1}{2} V^2 \qquad (2)$$

Equations (1) and (2) indicate that more modes can be guided if the core radius is large or if the refractive index difference is large. It is noted that equation (2) is not very accurate for small values of N, but it is useful for approximating the number of modes that will be propagated by a multimode optical waveguide.

It is possible to design an optical waveguide so that only one mode, the $HE_{11}$ mode, is propagated, thereby eliminating the aforementioned mode delay distortion and opening the way to a gigabit transmission. It has been determined that for such single mode operation, V must be less than 2.405. If V is set equal to 2.405, and equation (1) is evaluated, it can be seen that a method of limiting light propagation of a desired wavelength to one mode is to coordinate the wavelength parameters a, $n_1$, and $n_2$. That is, if the difference between the two indices of refraction $(n_1 - n_2)$ increases, the core radius must decrease, and if $(n_1 - n_2)$ decreases, the core radius must increase. Producing waveguides having core and cladding indices of refraction within limits necessary to maintain single mode propagation is difficult even for waveguides with very small cores. The difficulty is markedly increased in producing waveguides with larger cores, since the difference in refractive indices must be correspondingly decreased. As an example, if the optical waveguide is to have a small core, that is, a core diameter of approximately 1 micron, the required difference in the two indices of refraction will be of the order of $10^{-2}$, and if the optical waveguide is to have a large core, that is, a core diameter of approximately 1 millimeter, the required difference in the two indices of refraction would be even smaller, that is, on the order of $10^{-4}$.

Even though single mode waveguides exhibit extremely low pulse dispersion, the use thereof for long distance transmission of light is not feasible unless they are capable of providing low loss light transmission. Absorption losses can be minimized by employing high purity glasses having an extremely low content of impurities. Although some intrinsic scattering due to inhomogeneities of the dielectric material is unavoidable, scattering losses also result from core-cladding interface irregularities caused by the trapping of numerous tiny air bubbles and foreign particles at the interface and by core diameter variations due to inadequate dimensional control. Furthermore, for single mode waveguides, a well defined core-cladding interface is required. The present invention relates to a substantially continuous method of forming an optical waveguide in which these above-mentioned scattering losses are minimized.

DESCRIPTION OF THE PRIOR ART

A known method of producing a conventional optical fiber is disclosed in U.S. Pat. No. 3,227,032 issued to L. O. Upton. This method comprises inserting a rod of glass possessing the desired core characteristics into a tube of glass possessing the desired cladding characteristics. The temperature of this combination is then raised until the viscosity of the materials is low enough for drawing. The combination is then drawn until the tube collapses around and fuses to the inside rod. This resulting combination rod is then further drawn until its cross-sectional area is decreased to the desired dimensions. This method is normally used to produce glass optical fibers having large core and thin outside cladding. As an example, the total diameter to core diameter ratio of such a fiber might be 8:7.

The stringent optical requirements placed on the transmission medium to be employed in optical communication systems has negated the use of conventional glass fiber optics, since attenuation therein due to both scattering and impurity absorption is much too high. Since pure fused silica has the lowest known optical attenuation of any glass in the red and near infrared portion of the spectrum where optical communications appears most promising, pure fused silica and doped fused silica were among the earliest considered materials for use in the fabrication of optical waveguides. For example, single mode optical waveguides have been formed by inserting a titania doped silica fiber into a silica capillary. The tubing is heated and collapsed onto the central fiber, and the resulting cane is redrawn to waveguide dimensions. Waveguides produced by this method are unsatisfactory since the occurrence of numerous tiny air bubbles and foreign particles at the core-cladding interface and variations in core diameter cause very high attenuation.

U.S. Pat. No. 3,711,262 issued to D. B. Keck et al. discloses a method of forming a single and multimode waveguide having an unusually clean and strong bond between the core and cladding materials. Waveguides made in accordance with the method of that patent exhibit low attenuation resulting from light scattering centers at the core-cladding interface. The method of that patent comprises the steps of forming by the flame hydrolysis process (as this term is hereinafter defined) a coating of glass soot on the inside wall of a glass tube, heating the resultant structure to consolidate the glass soot and form a dense glass layer free from particle boundaries, and thereafter drawing the glass tube and glass layer combination to reduce the cross-sectional area thereof and to collapse the layer of glass to form a filament having a solid cross-sectional area. Although an improved core-cladding interface can be formed, this method does not readily lend itself to continuous preform formation.

Multimode fibers having a relatively low total diameter to core diameter ratio have been made by the method set forth in U.S. Pat. No. 3,737,292 issued to D. B. Keck et al. In accordance with the method of that patent a multimode optical waveguide is formed by applying a first layer of glass having a predetermined refractive index on the outside peripheral wall surface of a substantially cylindrical mandrel and thereafter applying a second layer of glass to the outside surface of the first coating, the refractive index of the second layer being less than that of the first layer. The mandrel is removed by acid etching, drilling or the like. The resulting cylindrical hollow assembly is then heated and drawn to reduce the cross-sectional area thereof and to collapse the first and inner layer of glass to form a solid filament having a high quality core-cladding interface. To employ this method to form a single mode optical waveguide having large total diameter to core diameter ratios, the thickness of the first applied glass layer must be drastically decreased and that of the second applied glass layer must be correspondingly increased, and it is therefore extremely difficult to control the diameter of the resultant waveguide core to the required tolerance.

Continuous optical fiber preform fabrication is described in U.S. Pat. No. 4,062,665 issued to T. Izawa et al. In accordance with the method of that patent, a refractory starting member is rotated and at the same time, moved along the axis of rotation. A glass raw material for the formation of the core of a porous preform and consequently an optical filament preform is introduced into a high temperature portion near the tip of a high temperature burner from a nozzle for the core disposed in alignment with the center of rotation of one end face of the starting member. The glass raw material blown out from the nozzle for the core is caused by the flames of the high temperature burner to react to produce fine glass particles, which are deposited on the end face of the starting member at the central portion thereof in its axial direction to form a porous core. At least one nozzle for spraying a glass raw material for the formation of the cladding of the optical filament preform is disposed opposite to the end face of the starting member but a little deviated from the axis of rotation thereof, or disposed opposite to the peripheral surface of the porous core. The glass raw material for the cladding is sprayed from the nozzle for the cladding to the high temperature portion of the high temperature burner, and caused to react to form fine glass particles, which are deposited on the end surface of the starting member on the outside of the porous core or on the peripheral surface thereof at the same time as the formation of the latter, forming a porous cladding. The porous preform thus obtained is moved into a high temperature furnace provided on the path of movement of the preform for the vitrification thereof into an optical filament preform. In this connection, reference is also made to the publication "Continuous Fabrication of High Silica Fiber Preform" by T. Izawa, S. Kobayashi, S. Sudo, and F. Hanawa, 1977 International Conference on Integrated Optics and Optical Fiber Communication, July 18–20, 1977, Tokyo, Japan, Technical Digest, pp. 375–377. The Izawa et al. patent and publication teach a continuous fabrication method for making multimode step index and graded index preforms by vapor phase axial deposition. This is a process in which the center bait rod is eliminated and both the core and the cladding glass soot are deposited continuously onto the end of a starting rod. However, the process taught by Izawa et al, does not lend itself to the fabrication of a single mode waveguide preform, where the core glass diameter is very small compared to the overall fiber diameter, and where a well defined interface is required. Either the multiple soot streams (for the core and cladding compositions) will intermingle in the deposition zone causing a very diffused core region or, if the soot streams are separated enough to alleviate this, a very large diameter, unwieldly, unsintered preform may result.

As used herein, vapor phase oxidation includes "chemical vapor deposition" and other vapor phase oxidation methods. The phrase "chemical vapor deposition" means the formation of deposits by chemical reactions which take place on, at, or near the deposition surface, a definition set forth on page 3 of the text "Vapor Deposition" edited by C. F. Powell et al., New York, John Wiley and Sons Inc., 1966, which text is hereby wholly expressly incorporated by reference. Any of the procedural variations well known in the art may be employed to effect the deposition of a suitable coating of glass by the chemical vapor deposition process.

Effective means of applying coatings by vapor phase oxidation is to sinter a soot layer of the desired material applied by the "flame hydrolysis" process, as hereinafter defined, similar to that described in U.S. Pat. No.

2,272,342 issued to J. F. Hyde or U.S. Pat. No. 2,326,059 issued to M. E. Nordberg, both of which patents are expressly incorporated herein by reference.

As will be understood, glass for optical waveguides is commonly formed by entraining a vapor in a carrier gas which is supplied to a deposition burner. The gas is reacted to deposit a soot of finely divided material. Early literature refers to the chemical process such as that of the Nordberg or Hyde patents, as flame hydrolysis. Recently, however, workers in the field have come to recognize that the chemical process is not hydrolysis but rather is oxidation. The "Handbook of Chemistry and Physics" describes oxidation as a process which increases the proportion of oxygen or acid forming elements in a compound. On the other hand, hydrolysis is defined as a reaction involving the splitting of water into its ions and the formation of a weak acid or base, or both. The definition of oxidation better describes the process which occurs in vapor deposition processes of this type. In any event, the burner is used in the prior art in the same way. The term "oxidizing" is used herein in the alternative for hydrolyzing because it more precisely describes the chemical process involved. The resultant product is the same regardless of the term used to describe the process.

SUMMARY OF THE INVENTION

It is an object of this invention to provide a method of forming a substantially continuous preform for an optical filament, the preform itself, and the resulting optical filament.

Another object of this invention is to provide a substantially continuous method of forming an optical waveguide having a well defined core-cladding interface and one which overcomes the disadvantages heretofore noted.

Briefly, according to this invention, a substantially continuous method of forming a preform for an optical filament, the preform itself, and the resulting optical filament is disclosed. A substantially longitudinally continuous core member is provided and affixed to a longitudinal starting member having at least one end surface suitable for affixing the core member thereto. Particulate material is applied to the exterior surface of the core member to form an adherent coating having an index of refraction less than that of the core member. The starting member and the core member are longitudinally translated while simultaneously applying the adherent coating of particulate material to the core member thereby forming a substantially continuous and homogeneous adherent coating of substantially uniform thickness. The adherent coating is substantially simultaneously or subsequently heated to sinter or consolidate it to form a solid blank or preform. The structure so formed is heated to the drawing temperature of the materials thereof and drawn to reduce the cross-sectional area thereof to form a substantially continuous optical filament, the core member comprising the core while the consolidated coating comprising the cladding of the optical filament. The consolidation of the adherent coating and the drawing may take place as part of one continuous process with either one or separate heating steps for each, or the consolidation may take place following the application of the particulate material and the preform subsequently drawn to an optical filament in separate steps and at different times. To facilitate the application of particulate material to the exterior surface of the core member, the longitudinal starting member and consequently the core member may be simultaneously rotated about the longitudinal axis while longitudinally translated.

These and other objects, features and advantages of the present invention will become apparent to those skilled in the art from the following detailed description and the attached drawings, on which, by way of example, only the preferred embodiments of this invention are illustrated.

DETAILED DESCRIPTION OF THE INVENTION

It is to be noted that the drawings are illustrative and symbolic of the present invention and there is no intention to indicate scale or relative proportions of the elements shown therein. For purposes of simplicity, the present invention will be described in connection with the substantially continuous formation of a single mode optical waveguide preform and the waveguides themselves although this invention is not intended to be limited thereto.

Figure 1:
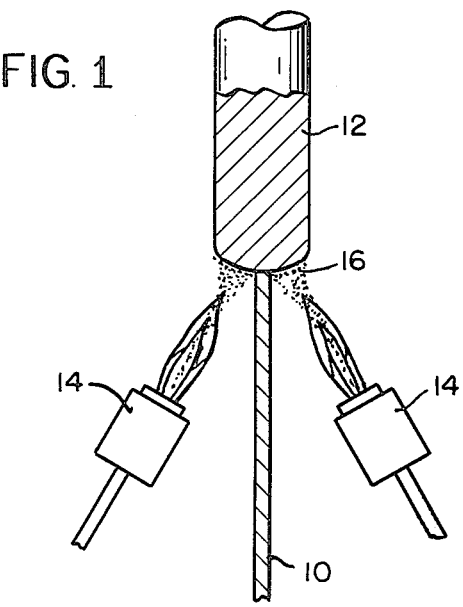
FIG. 1 is a fragmentary elevational view partially in cross-section illustrating the commencement of the application of particulate material to the core member.

Referring to FIG. 1, there is shown a relatively thick solid glass filament or core member 10 rigidly affixed to one end of starting member 12. Core member 10 will ultimately form the core of the optical waveguide and may be formed by any process known in the art, such as for example, inside or outside vapor phase oxidation including chemical vapor deposition, core drilling a solid rod from a larger body, direct melt drawing, or the like. The core member may also be formed by any of the preceding methods in a size larger than required and thereafter drawn to a desired diameter. Since the core member will ultimately form the core of the optical waveguide, its composition and purity must be of the type and quality suitable for optical waveguide applications. Suitable examples of core member materials are pure fused silica, doped fused silica, germania, or other high purity optical quality glasses.

Starting member 12 may be connected to any means known in the art, not shown, for translating along its longitudinal axis. The starting member may also be rotated about its longitudinal axis, if desired, as hereinafter more fully described. Starting member 12 may be formed of any suitable material such as glass, refractory materials such as $Al_2O_3$, mullite, $Si_3N_4$, or the like as long as the starting member does not degrade during subsequent steps and the core member can be affixed thereto as, for example, by fusion or the like. The end surface of starting member 12 is illustrated in FIG. 1 with a convex surface, but may also be a flat surface or a concave surface. The end of starting member 12 may also be "balloon" shaped or ball-like providing a convex deposition surface. However, the configuration of the end surface is not critical. Ordinarily, both core member 10 and starting member 12 would be cylindrical, however, the geometric shape of either is similarily not critical.

An adherent coating of particulate material which will ultimately form the cladding of the waveguide is then deposited by means of one or more burners 14 on the end surface of starting member 12 and the exterior surface of core member 10. Any burners, including flat faced burners, ribbon burners, ring burners, or the like, which provide a stream of particulate material that can be directed to the core member are suitable for the present purposes. For an illustration of suitable burners, reference is made to U.S. Pat. No. 3,565,345 and U.S. Pat. application Ser. No. 883,927, filed Mar. 6, 1978 by D. R. Powers. The particulate material 16 which forms an adherent coating on core member 10 may be any material suitable for the cladding of an optical waveguide but must have an index of refraction less than that of said core member. Suitable means for delivering constituents to burners 14 may be any means known in the art, for an illustration of which reference is made to U.S. Application Ser. No. 872,619 filed Jan. 26, 1978 by M. A. Aslami, which application is hereby expressly incorporated by reference.

Figure 2:
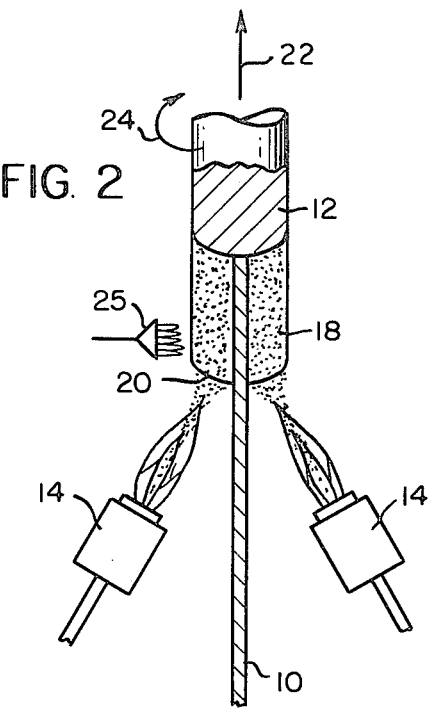
FIG. 2 is a fragmentary elevational view partially in cross-section illustrating the buildup of particulate material on the exterior surface of the core member.

Referring additionally to FIG. 2, it is seen that as the particulate material is applied or deposited, an adherent coating 18 of soot or particulate material is formed on the exterior surface of core member 10. By an adherent coating of soot or particulate material is meant a relatively porous body wherein small particles of glass or of the material being deposited become attached to one another with some voids therebetween. It will be understood that, if desired, coating 18 may be deposited in the form of solid glass without first making a porous body. In such an embodiment, the step of subsequently consolidating the porous body, as hereinafter described, would be eliminated. However, in depositing coating 18 in solid form, the material of core member 10 must have a softening temperature sufficiently high and the coating material must have a consolidation temperature sufficiently low to permit the coating to consolidate without deleteriously affecting the core member and the resulting structure. One example of a combination of materials suitable for depositing a solid coating 18 may be a core member 10 formed of silica and a deposited coating 18 formed of a compatible softer glass having a lower index of refraction. Such a core member may also have a barrier layer applied to the exterior surface thereof with the combination comprising the starting core member 10. Application of a barrier layer and the advantages thereof is more fully described hereinafter.

As will be understood, a plurality of burners 14 may be disposed about and/or along the longitudinal axis of core member 10 in such a manner as to permit a substantially uniform radial deposition of the particles from the burner at the end surface 20 of coating 18. Such burners may include ribbon burners, ring burners or the like. It is understood that end surface 20 will be continually newly formed by the deposition of the particulate material. Burners 14 will be disposed and directed so as to obtain the most efficient deposition of particles on end surface 20. Since burners 14 would as a practical matter be stationary insofar as longitudinal translation is concerned, starting member 12 with core member 10 affixed thereto is translated along the longitudinal axis thereof in the direction illustrated by arrow 22 at a velocity corresponding to the rate of buildup of particulate material on end surface 20, so that end surface 20 is in a relatively fixed position relative to burners 14.

As will be understood, a single burner 14 may be employed or some plurality of burners 14 may be employed which may or may not form a substantially continuous radial layer of particulate material on end surface 20. In the latter case, starting member 12 may additionally be rotated as indicated by arrow 24 to facilitate more uniform deposition of the particulate material at end surface 20. Towards this end, the present invention also contemplates rotating the burners about end surface 20 or employing a ring burner. This may be in addition to rotating starting member 12, in place thereof, or any combination thereof. In addition, when desired an auxiliary heat burner 25 may be used to facilitate sintering of the soot particles deposited by deposition burner or burners 14.

Figure 3:
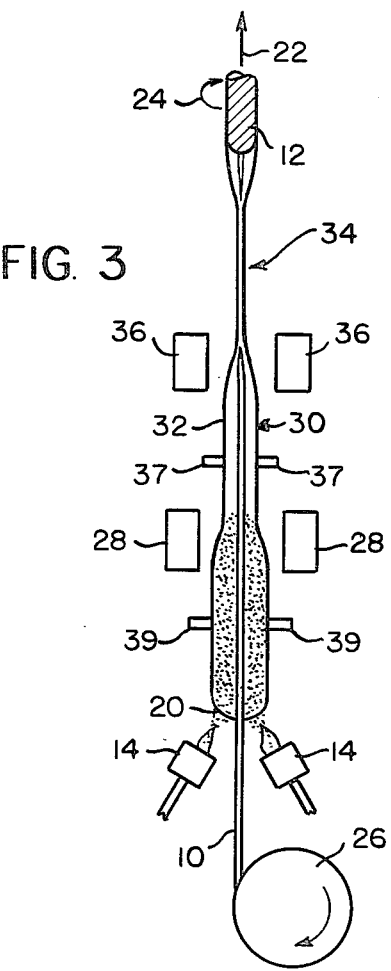
FIG. 3 is a fragmentary elevational view partially in cross-section illustrating the substantially continuous formation of an optical filament of the present invention.

Referring to FIG. 3, there is illustrated a more complete representation of the overall method of one embodiment of the present invention. Core member 10 is supplied from reel 26 in a substantially continuous manner along a longitudinal axis substantially coincident with or parallel to the longitudinal axis of starting member 12. It will also be understood that the present invention also contemplates the embodiment of "butt" sealing or welding relatively short lengths of core member 10 in place of having it coiled on reel 26. In such an embodiment composite core member 10 will similarly be substantially continuous. It should be noted that, even when reel 26 is employed, the core member on subsequent reels may also be "butt" sealed or welded to the end of the preceding member as it is fully unreeled thus making it substantially continuous.

One or more burners 14 apply or deposit particulate materials to the exterior surface of core member 10 forming an adherent and relatively porous coating 18 to the exterior surface of core member 10. As heretofore noted, starting member 24 is translated in the direction illustrated by arrow 22 and may additionally be rotated as illustrated by arrow 24 to permit substantially uniform deposition of the particulate material on end surface 20. As the adherent coating is longitudinally translated it is heated at some subsequent point by heaters 28, at which point adherent coating 18 is sintered or consolidated forming a solid preform or blank 30 comprising core member 10 and a consolidated cladding portion 32.

As a further step of the substantially continuous method of forming an optical waveguide 34, solid preform 30 may be subsequentially heated along its longitudinal path by heaters 36 where the temperature of the composite theretofore formed is raised to the drawing temperature of the materials thereof and drawn into an optical waveguide or filament 34 in a manner well known in the art. As will be understood, in such a continuous method the translational velocity of starting member 12 will be of a magnitude sufficient to permit uniform deposition of particulate material to end surface 20 up to the point of drawing the solid preform into an optical waveguide or filament and, thereafter, increased to a velocity to permit the drawing of waveguide 34. As will be understood, when solid preform 30 is drawn into a filament 34, the length thereof is substantially increased wherefore the longitudinal velocity of starting member 12 must be increased to facilitate the substantially increased length of filament 34 over the length of preform 30. The apparatus for controlling the translational and/or rotational speed of starting member 12 is not shown, and is well known in the art such as, for example, a variable speed motor with or without a clutch. A typical rotational speed may be 30 RPM, however, the rotational speed is determined by the materials deposited, deposition rates, as well as other parameters involved in each particular case. Furthermore, as heretofore noted, starting member 12 need not be rotated, rather the burners may be rotated or a ring burner may be used or some combination thereof.

It will also be understood that when filament drawing is commenced, rotation of coating 18 and/or solid preform 30 will be difficult if not impossible by rotation of starting member 12 since the softened glass at the drawing temperature will simply shear upon itself without transmitting torque to preform 30 or any part of the structure below it. In addition, the portion of the structure below the drawing area will need physical support. This is also true if the drawn filament itself is subsequently reeled, sheared off at any desired length, or when the solid preform is sheared for subsequent drawing as herein described. Means 37 and 39 comprising, for example, a plurality of rollers surrounding solid preform 30 and coating 18 respectively and mounted so as to support, rotate and translate the structure, are provided. Such support roller means are well known in the art. It will be noted that it is not necessary to have both means 37 and 39 in any particular application since a single means may accomplish the desired results. If desired, reel 26 may also be rotated not only about its own central axis to unreel core member 10, but rotated about the longitudinal axis of coating 18 and solid preform 30 to permit rotation of the entire structure as coating 18 is being applied. The above described rotations may be used in conjunction with burner rotation as herein described, in place thereof, or any combination thereof.

For additional teaching of application of particulate material, consolidation, and drawing reference is hereby made to U.S. Pat. No. 3,659,915 to R. D. Maurer and P. C. Schultz, U.S. Pat. No. 3,711,262 to D. B. Keck and P. C. Schultz, U.S. Pat. No. 3,737,292 to D. B. Keck, P. C. Schultz, and F. Zimar, U.S. Pat. No. 3,775,075, to D. B. Keck and R. D. Maurer, U.S. Pat. No. 3,806,570 to J. S. Flamenbaum, P. C. Schultz, and F. W. Voorhees, U.S. Pat. No. 3,859,073 to P. C. Schultz, and U.S. Pat. No. 3,884,550 to R. D. Maurer and P. C. Schultz, all of which patents are hereby expressly incorporated herein by reference.

Figure 4:
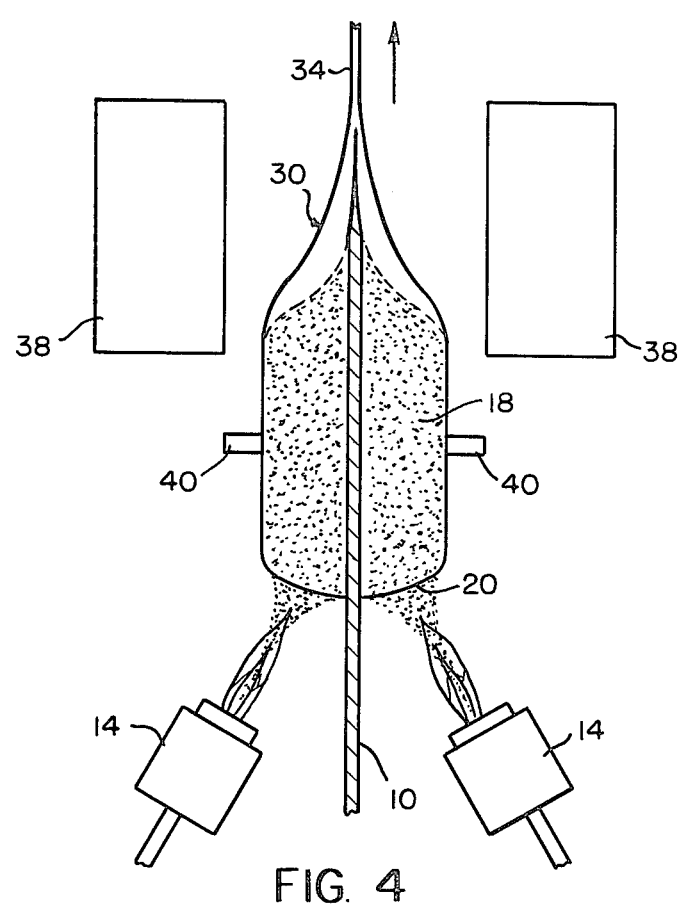
FIG. 4 is a fragmentary elevational view partially in cross-section illustrating another embodiment of the present invention.

Another embodiment of the present invention is illustrated in FIG. 4 wherein the steps of consolidation and drawing are combined. In this embodiment, particulate material is applied by burners 14 to the end surface 20 of adherent coating 18 on core member 10 as hereinabove described. Heaters 38 heat the composite so formed to consolidate porous coating 18 into a solid preform 30 and drawing preform 30 into an optical waveguide or filament 34 in a substantially continuous step requiring only one heating step. That is, heaters 38 heat the porous adherent coating 18 to a temperature sufficient to consolidate the coating and to permit drawing the solid preform into a fiber. All the other parameters described hereinabove in connection with the present process could remain substantially the same including the rotation of the preform, employing a ring burner, and the like. Means 40 for supporting, rotating and translating the structure so formed may also be provided and may be means such as 37 and 39 described in connection with FIG. 3. In connection with drawing filaments reference is hereby made to U.S. Patent applications Ser. Nos. 879,154 and 879,155, both filed on Feb. 21, 1978 by A. C. Bailey; both said applications being hereby expressly incorporated by reference.

In each of the embodiments described herein or contemplated hereby core member 10 may comprise only that portion of the ultimate waveguide filament generally referred to as the core or may be the core with a barrier layer applied to the exterior surface thereof. The barrier layer, sometimes referred to in the art as an applied cladding, is a coating of material intermediate the core and the outer cladding and serves various purposes. For example, the barrier layer may serve as a barrier to the diffusion of hydrogen ions or impurities from the outer cladding to the core. Further, if it is immediately applied to the core surface, it may provide a better interface between the core and the cladding. In addition, it may improve handling of core member 10 at start-up and subsequent sealing to additional core members in a continuous process. Functionally, however, the barrier layer comprises the inner portion of the cladding which place is the boundary for a high proportion of the light being propagated through the waveguide, very little light being propagated through the outer cladding for an effective optical waveguide. In this connection, reference is made to the Kapany publication and U.S. Pat. No. 3,711,262 noted hereinabove. In the situation where a barrier layer is employed, the outer cladding applied in the form of coating 18 need not be of as high an optical quality as would otherwise be necessary since only a very small, if any, part of the light propagated would be propagated in the outer cladding. The barrier layer may be formed by any suitable process such, for example, as vapor phase oxidation or the like.

It is also to be noted that in the embodiments wherein the consolidated blanks or preforms are not continuously drawn into waveguide filaments, the blanks or preforms may be cut or severed at predetermined desired lengths for subsequent drawing. Similarly, when the blank or preform is continuously drawn into a filament, the filament may be cut or severed at predetermined lengths without interruption to the continuous preform formation.

A specific example of the substantially continuous method of forming an optical waveguide blank is as follows. A high optical quality core member as prepared first in a separate step and introduced into the process as a solid thick glass filament with a diameter of approximately 1.5 millimeters in diameter. this core member may be prepared, for example, by the standard vapor deposition processes heretofore noted by depositing a single composition soot preform, such as 2 wt.% $GeO_2$ with the remainder being $SiO_2$ glass, zone consolidating such as member with chlorine drying as described in U.S. Pat. No. 3,933,454 to R. D. DeLuca and U.S. Patent application Ser. No. 883,927 filed Mar. 6, 1978 by D. R. Powers, both of which are hereby expressly incorporated by reference, and thereafter drawing it into a solid filament having well controlled dimensions. Variations on such an outside vapor phase oxidation process, such as employing integral baits or starting members or axial deposition could also be used to provide the solid starting core member. The core member is then wound on a drum and unreeled as necessary for the present process. Other processes such as high purity melts, etc. may also be used to obtain the core member.

A specific example of forming an optical waveguide blank of the present invention is as follows. A 1.5 mm. rod or core member was affixed by fusion to a 2 cm. diameter, substantially flat ended starting member. The core member had a composition of about 2% by weight $GeO_2$ with the balance being $SiO_2$. The starting member was formed of 2 cm. Vycor brand (96% silica) tube having the lower end sealed shut. A flat faced burner of the type described in U.S. Patent application Ser. No. 883,927, filed Mar. 6, 1978 by D. R. Powers was disposed with the burner surface being at an angle of approximately 30° to the longitudinal axis of the core member at a distance of approximately 13 cm. to the deposition surface. The burner was equipped with a Vycor brand draft shield surrounding the flame having an outside diameter of 5 cm. and being 9 cm. long. The starting member was attached to a rotation and vertical translation apparatus. The rotation was accomplished by a variable speed motor with a clutch while the translation was accomplished by disengagable screw mechanism.

The burner flame consisted of natural gas flowed at 5.7 liters per minute and oxygen flowed at 4 liters per minute. Oxygen was flowed to the inner shield at 1.2 liters per minute and to the outer shield at 3 liters per minute. The by-pass or excess oxygen was flowed at 0.14 liter per minute. The reactant was flowed to the deposition burner from a delivery system such as described in the heretofore noted Aslami application. The reactant was supplied to the burner at 2.2 liters per minute by bubbling oxygen through an $SiCl_4$ bath maintained at approximately 35° C. in the delivery system.

The starting member was rotated at about 15 RPM and $SiO_2$ soot particles were deposited thereon for about 10 minutes to establish a starting coating on the core member. Then longitudinal translation of the starting member was commenced at a velocity of 20 cm per hour while deposition of $SiO_2$ soot particles continued for about one more hour. Auxiliary heat was directed at the preform being formed at a point downstream from the deposition burner by an auxiliary burner known as fishtail burner No. 1253 manufactured by the Carlisle Burner Co., of Millville, N.J. The auxiliary burner flame consisted of natural gas flowed at 3.4 liters per minute and oxygen flowed at 2.9 liters per minute. The burner face was positioned about 4 cm. from the preform in the manner illustrated in FIG. 2.

In this example the process was discontinued after about one hour, whereupon, a preform of approximately 20 cm. long and 3.5 cm in diameter was formed. It will be understood that the above process could have been continued indefinitely if desired. The above described apparatus did not have an integral consolidation furnace, wherefore, the blank so formed was removed and placed in a consolidation furnace having a helium atmosphere. The porous preform was consolidated into a solid preform by zone firing at 1450° C. while translating it at a velocity of about 20 cm. per hour. The resulting solid preform or blank had an approximate 10:1 outside diameter to core diameter ratio.

It is rationalized that due to the size and shape of the end surface of the starting member together with the angle of the burner, the initial buildup of an adherent coating was relatively small for a given length of time, and increased as the adherent coating was built up. The preform formed in accordance with this exmaple was not drawn into a filament, however, filament drawing is well knwon and understood in the art.

Another example of a substantially continuous method of forming an optical waveguide in accordance with the present invention is as follows. The cladding glass particles may be deposited by the vapor phase oxidation process as hereinabove described and simulataneously solidified if the temperature required for simultaneous deposition and consolidation does not deform the core member, and the materials of the core member and the applied cladding coating are compatible insofar as thermal expansion, index of refraction, fluidity, and the like are concerned. An example of glasses that may achieve this result are as follows, the core member may be a composition having about 16 weight percent $Ta_2O_5$ with the balance being $SiO_2$. Such a composition has an index of refraction of about 1.490, a liquidus temperature of approximately 1600° C., and a thermal expansion coefficient of approximately $6 \times 10^{-7}/°$ C. The cladding may be a composition having about 14 weight percent $B_2O_3$, about 26 weight percent $P_2O_5$ and the balance about 60 weight percent $SiO_2$. This composition has an index of refraction of about 1.486, a liquidus temperature of approximately 950° C., and a thermal expansion coefficient of approximately $45 \times 10^{-7}/°$ C.

The optical waveguides produced in accordance with the present invention from the substantially continuous method of forming an optical waveguide blank and the resulting optical waveguide are particularly suitable and adapted to the propagation of energy of only one or a few modes. The present method is particularly suitable for the formation of waveguides having a total waveguide diameter to core diameter ratio of about 10:1 and can result in the formation of excellent quality interface between the waveguide core and cladding and a waveguide of very low attenuation.

Although the present invention has been described with respect to specific details of certain embodiments thereof, it is not intended that such details be limitations upon the scope of the invention except insofar as set forth in the following claims.

I claim:

1. A substantially continuous method of forming an optical waveguide blank comprising the steps of
   providing a substantially longitudinally continuous core member,
   providing a longitudinal starting member having at least one end surface suitable for affixing said core member thereto,
   affixing one end of said core member to said one end of said starting member,
   applying particulate material to the exterior surface of the core member to form an adherent coating having an index of refraction less than that of said core member, and
   longitudinally translating said starting member and said core member while simultaneously applying said adherent coating of said particulate material to said core member to form a continuous and substantially homogeneous adherent coating of substantially uniform thickness.

2. The method of claim 1 further comprising the step of heating said adherent coating to sinter or consolidate it thereby forming a solid blank.

3. The method of claim 1 further comprising the step of rotating said starting member and said core member about said longitudinal axis while simultaneously longitudinally translating said starting member and said core member.

4. The method of claim 1 wherein said particulate material is applied by means of at least one flat faced burner.

5. The method of claim 4 wherein said burners are rotated about the longitudinal axis of said starting member and said core member.

6. The method of claim 1 wherein said particulate material is applied by means of a ring burner.

7. The method of claim 1 wherein said one end surface of said longitudinal starting member is flat.

8. The method of claim 1 wherein said end surface of said longitudinal starting member is concave.

9. The method of claim 2 further comprising the step of severing a predetermined desired length of said solid blank.

10. The method of claim 1 further comprising the step of applying said particulate material and consolidating it into a solid blank in a substantially continuous step.

11. The method of claim 1 further comprising the step of applying auxiliary heat to the exterior surface of said adherent coating.

12. The method of claim 1 wherein said longitudinal starting member is fed from a reel in a substantially continuous manner.

13. The method of claim 1 wherein said core member includes a barrier layer applied to the exterior surface thereof.

14. A substantially continuous method of forming an optical waveguide comprising the steps of
providing a substantially longitudinally continuous core member,
providing a longitudinal starting member having at least one end surface suitable for fixing said core member thereto,
affixing one end of said core member to said one end of said starting member,
applying particulate material to the exterior surface of said core member to form an adherent coating having an index of refraction less than that of said core member,
longitudinally translating said starting member and said core member while simultaneously applying said adherent coating of said particulate material to said core member to form a continuous and substantially homogeneous adherent coating of substantially uniform thickness,
heating said adherent coating to sinter or consolidate it thereby forming a solid blank,
futher heating the structure so formed to the drawing temperature of the materials thereof, and
drawing the heating structure so formed to the cross-sectional area thereof and form a substantially continuous optical waveguide, the core member comprising the core while the consolidated coating comprising the cladding of said optical waveguide.

15. The method of claim 14 further comprising the step of rotating said starting member and said core member about the longitudinal axis of said core member and said starting member while simultaneously longitudinally translating said starting member and said core member.

16. The method of claim 14 wherein said particulate material is applied by means of at least one flat faced burner.

17. The method of claim 16 wherein said burners are rotated about the longitudinal axis of said starting member and said core members.

18. The method of claim 14 wherein said particulate material is applied by means of a ring burner.

19. The method of claim 14 wherein said one end surface of said longitudinal starting member is flat.

20. The method of claim 14 wherein said end surface of said longitudinal starting member is concave.

21. The method of claim 14 further comprising the step of severing a predetermined desired length of said optical waveguide.

22. The method of claim 14 further comprising the step of applying auxiliary heat to the exterior surface of said adherent coating before it is consolidated.

23. The method of claim 14 wherein said longitudinal starting member is fed from a reel in a substantially continuous manner.

24. The method of claim 14 wherein said core member includes a barrier layer applied to the exterior surface thereof.

25. The method of claim 14 further comprising the step of rotating said core member about the longitudinal axis of said core member.

* * * * *

UNITED STATES PATENT AND TRADEMARK OFFICE
CERTIFICATE OF CORRECTION

PATENT NO. : 4,230,472
DATED : October 28, 1980
INVENTOR(S) : Peter C. Schultz

It is certified that error appears in the above-identified patent and that said Letters Patent are hereby corrected as shown below:

Column 3, line 22 "attenation" should be -- attenuation --.

Column 4, line 14 "per-" should be -- pre- --.

Column 10, line 48 "as" should be -- is --.

Column 10, line 56 "as" should be -- a --.

Column 11, line 66 "exmaple" should be -- example --.

Column 11, line 68 "knwon" should be -- known --.

Column 12, line 5 "simula-" should be -- simul- --.

Signed and Sealed this

Tenth Day of March 1981

[SEAL]

Attest:

RENE D. TEGTMEYER

Attesting Officer — Acting Commissioner of Patents and Trademarks